United States Patent
Winker

(10) Patent No.: US 8,109,707 B2
(45) Date of Patent: Feb. 7, 2012

(54) NUT HAVING A NUT BODY AND A CAP HELD ON THE NUT BODY

(75) Inventor: Alexander Winker, Spaichingen (DE)

(73) Assignee: Metallwarenfabrik Hermann Winker GmbH & Co., KG, Spaichingen (DE)

( * ) Notice: Subject to any disclaimer, the term of this patent is extended or adjusted under 35 U.S.C. 154(b) by 679 days.

(21) Appl. No.: 11/641,597

(22) Filed: Dec. 19, 2006

(65) Prior Publication Data
US 2007/0264101 A1  Nov. 15, 2007

(30) Foreign Application Priority Data

Dec. 19, 2005 (DE) .................. 10 2005 061 041
Jun. 22, 2006 (DE) .................. 10 2006 028 577

(51) Int. Cl.
*F16B 37/14* (2006.01)

(52) U.S. Cl. .................. 411/430; 411/429; 411/375

(58) Field of Classification Search .................. 411/375, 411/429–431
See application file for complete search history.

(56) References Cited

U.S. PATENT DOCUMENTS

| | | | | |
|---|---|---|---|---|
| 1,381,587 | A * | 6/1921 | Noble | 411/429 |
| 4,015,503 | A | 4/1977 | Romano | |
| 4,143,578 | A * | 3/1979 | Becker | 411/430 |
| 4,557,654 | A * | 12/1985 | Masuda et al. | 411/431 |
| 4,824,305 | A * | 4/1989 | McCauley | 411/431 |
| 5,624,218 | A * | 4/1997 | Dauwalter | 411/87 |
| 5,630,687 | A * | 5/1997 | Robinson | 411/372.6 |
| 5,749,690 | A * | 5/1998 | Kutz | 411/431 |
| 5,772,377 | A | 6/1998 | Bydalek | |
| 6,398,471 | B1 * | 6/2002 | Fischer | 411/8 |
| 6,866,457 | B2 * | 3/2005 | Wilson | 411/431 |
| 7,004,700 | B2 * | 2/2006 | Wilson | 411/372.6 |
| 7,172,381 | B2 * | 2/2007 | Miyazaki | 411/372.6 |
| 2008/0044254 | A1 * | 2/2008 | Wilson | 411/429 |

FOREIGN PATENT DOCUMENTS

DE 102 56 653 A1 6/2004
EP 1 422 427 A1 5/2004

* cited by examiner

*Primary Examiner* — Flemming Saether
(74) *Attorney, Agent, or Firm* — Kriegsman & Kriegsman

(57) ABSTRACT

The present invention relates to a nut (10, 110, 210) having a nut body (11, 111, 211) and a cap (20, 120, 220, 320) held on the nut body (11, 111, 211), wherein there is/are provided on the outer surface of the nut body (11, 111, 211) an encircling recess (16, 216) or recesses (116) encircling in sections, in which an encircling prominence (23) provided on the inner surface of the cap (20, 120, 220 320) or respectively prominences (123, 330) encircling in sections engage.

10 Claims, 4 Drawing Sheets

NUT HAVING A NUT BODY AND A CAP HELD ON THE NUT BODY

The present invention relates to a nut having a nut body and a cap held on the nut body.

Such nuts are used as wheel nuts for example, the cap having a decorative function. These nuts serve in particular for fastening wheel rims to a wheel hub. The caps are produced from mirror-finished stainless steel and are put onto the nut body.

It is normal practice to firmly connect such a cap to the nut body of a wheel nut by means of electric ring welding. In the process, however, the decorative outer surface of the cap may be impaired. In addition, surface coatings such as, for example, a paint layer in the form of a zinc flake coating are now conventional, but these surface coatings are partly electrically nonconductive and therefore rule out a welded connection.

A reliable mechanical connection between the nut body and the cap is therefore aimed at. DE 102 56 653 A1 discloses a wheel nut in which the cap is held together with a thrust washer on the nut body by a locking means. The locking means is designed as an edge which runs around the locking means and overlaps both the collar and a flange formed on the free end of the cap. However, such fastening of the cap on the nut body is not possible when a wheel nut without a thrust washer is desired. For this case, EP 1 422 427 A1 proposes to hold an undersize cap on the nut body by means of an interference fit, the cap being deformed elastically and plastically. However, fitting is difficult, and the decorative surface of the cap may be impaired. In addition, there is the risk of the cap being released from the nut body during a correspondingly large mechanical stress. To this end, U.S. Pat. No. 4,015,503 proposes to draw the bottom free end of the cap into the nut body, which, however, is very complicated in production. The same applies to the proposal of U.S. Pat. No. 5,772,377 to bend the bottom free end of the cap around an encircling flange on the nut body. In addition, this proposal cannot be realized if a flange is to be dispensed with.

The object of the present invention consists in developing a nut having a nut body and a cap held on the nut body in such a way that the cap is held on the nut body in a secure and reliable manner, the design freedom for the nut body being restricted as little as possible.

The solution consists in a nut having the features of patent claim 1. According to the invention, provision is made for there to be provided on the outer surface of the nut body an encircling recess or recesses encircling in sections, in which an encircling prominence provided on the inner surface of the cap or respectively prominences encircling in sections engage.

The nut according to the invention is thus distinguished by the fact that the cap and the nut body are connected to one another along their lateral surfaces. In this case, encircling raised structures provided on the inner surface of the cap engage in corresponding encircling recessed structures provided on the outer surface of the nut body. The basic idea according to the invention therefore consists in connecting the cap to the nut body not with its free end but rather above the latter. This measure can be realized with nut bodies of any desired configuration, so that all restrictions concerning the design of the nut body no longer apply. In addition, a sound structural connection is produced between the nut body and the cap, this connection holding the cap on the nut body more reliably than an interference fit alone. Finally, the nut body and the cap can each be produced in one operation by simple forming processes; an additional operation, for example in the form of a machining or beading operation, is dispensed with. Fitting is also much less complicated than welding the cap on the nut body. Finally, all the desired surface treatments of the individual components can be carried out.

Advantageous developments follow from the subclaims.

The recess or the recesses is/are expediently provided in the region of an application surface, for example a hexagon, provided on the outer surface of the nut body for a tool. However, in a preferred embodiment, they may also be arranged above an application surface provided on the outer surface of the nut body for a tool. A single encircling recess in the outer surface of the nut body and a single encircling, for example bead-like, prominence in the inner surface of the cap are in this case especially simple to realize.

A further advantageous configuration of the invention consists in designing the encircling recess in the same form as the application surface for the tool, for example as a hexagon, but with a smaller width across the flats. This simplifies in particular the automation of the production of the nut body. This is a substantial cost factor in the case of mass-produced products such as the nut body in question.

If the encircling recess is provided above the application surface for a tool, it can be defined by an overhanging bead formed at the edge of an end face of the nut body. The overhanging bead can be produced by upsetting the end face of the nut body after the nut body has been produced. Clamping retention of the cap is thus supplemented and assisted by positive-locking retention. The cap therefore sits on the nut body in a firm and captive manner.

The cap of the nut according to the invention may also have an embellishing or decorative function. In this case, it may be desired to provide the cap of such a nut with a smooth outer surface, that is to say without prominences directed radially inward. One possibility of producing such a nut consists in providing the cap with a sleeve which bears against its inner surfaces and which in turn has prominences which are directed radially inward and engage in the recesses formed on the nut body. The sleeve can be held in the cap by clamping, adhesive bonding, brazing, welding or the like.

The nut body may of course have a widened radial collar which at least partly encloses the cap. Furthermore, the nut body may have a conical bearing surface below the cap. It is then expedient for the free encircling edge of the cap to be at a distance from the conical bearing surface in order not to impair the fitting of the nut, for example during the fastening of a wheel rim. Finally, the cap may additionally bear against the nut body in a manner free of play, that is to say with a light interference fit.

Exemplary embodiments of the present invention are explained in more detail below with reference to the attached drawings, in which, schematically and not to scale:

Figure 1:
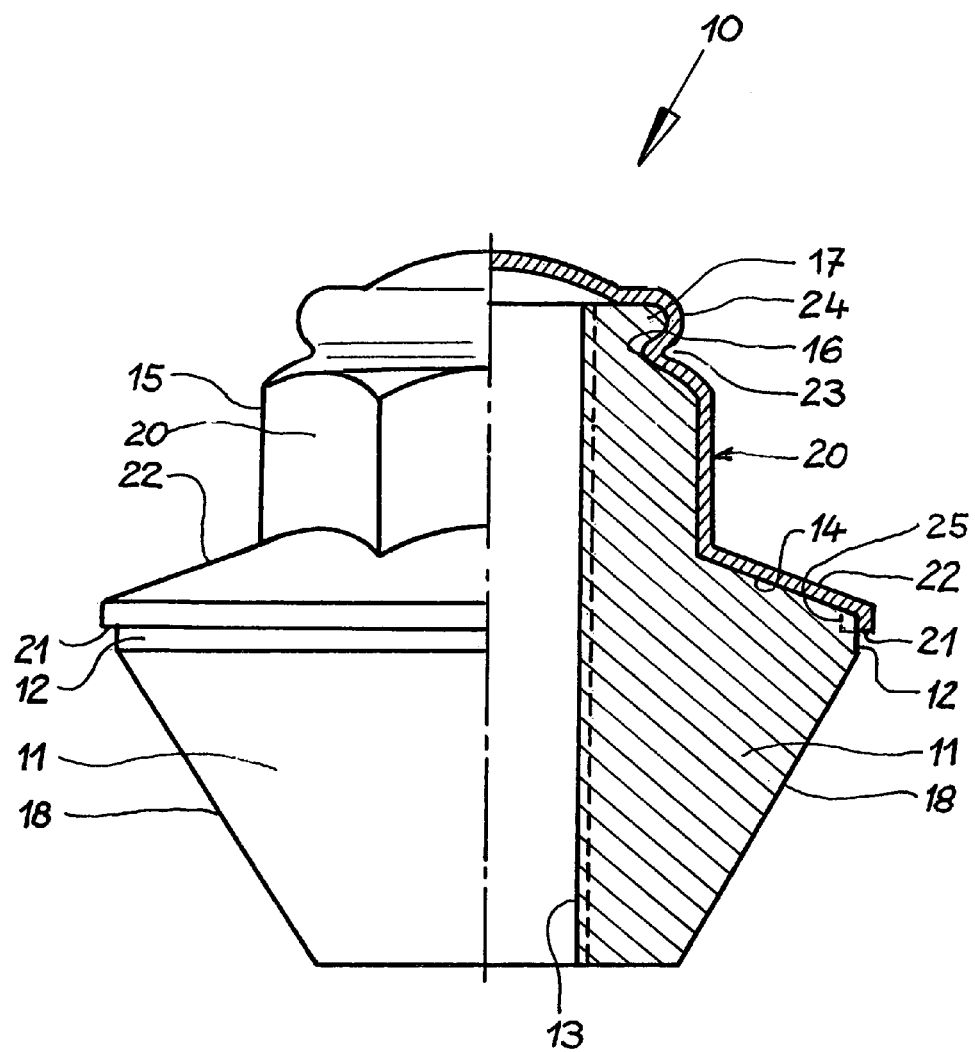
FIG. 1 shows a first exemplary embodiment of a nut according to the invention, the left-hand half being an elevation and the right-hand half being a sectional illustration.

The exemplary embodiment shown in FIG. 1 of a nut according to the invention is a wheel nut 10 which serves to fasten a wheel rim to a wheel hub. The wheel nut 10 has a nut body 11 having an encircling radially widened collar 12 and a conical bearing surface 18 provided below the collar 12. The nut body 11 is provided with an axial tapped hole 13 for accommodating a stud bolt (not shown).

The nut body 11 is encased by a cap 20, which is made, for example, of polished, stainless steel. The free end 21 of the cap 20 bears on the radially widened collar 12 of the nut body 11, but encloses it only partly (that is to say the free end 21 is at a distance from the conical bearing surface 18), in order not to impair the fitting of the wheel nut 10 onto a wheel rim. Above the radially widened collar 12, the nut body 11 is provided with an encircling shoulder 14, and the cap 20 has a step 22 adapted to the shape of the shoulder 14. This meander-like design largely prevents the ingress of moisture between the nut body 11 and the cap 20. In order to optimize this effect, the cap 20 sits on the nut body 11 by means of a light interference fit. For the same purpose, the free end 21 of the cap 20 bears on the radially widened collar 12 of the nut body 11 with a light interference fit.

In a variant, the free end 21 of the cap 20 may also rest in an encircling step 25 formed in the radially widened collar 12, as shown by a broken line in FIG. 1. In this case, too, the free end 21 can rest with a light interference fit in the step 25.

Above the radially widened collar 12 and the encircling shoulder 14, the nut body 11, in the exemplary embodiment, is provided with a hexagon 15 for the application of a fitting tool. Above the hexagon 15, the nut body 11 has an encircling recess 16, adjoining which is an encircling bead 17. Corresponding to the recess 16, the cap 20 has a prominence in the form of an encircling constriction 23, which engages in the recess 16 of the nut body 11. Above the constriction 23, the cap 20 has an encircling shaped portion 24, which encloses the bead 17.

Both the nut body 11 and the cap 20 can each be produced in one operation by forming processes known to the person skilled in the art, for example the nut body 11 by cold or hot pressing and the cap 20 by deep drawing. Two fitting methods are suitable for fitting the cap 20 on the nut body 11.

The first variant consists in the cap 20 already being provided with the constriction 23 and the shaped portion 24 during the production process. The cap 20 is then simply clipped onto the nut body 11, for example like a pushbutton. The second variant provides for the cap 20 to be produced with a cylindrical lateral surface, that is to say without constriction and shaped portion. The cap 20 is then put onto the nut body 11, and the constriction 23 and thus the shaped portion 24 are subsequently molded into the cap 20 by means of a suitable tool, for example a collet adapted to the constriction 23, so that the constriction 23 engages in the recess 16 of the nut body 11.

Figure 2:
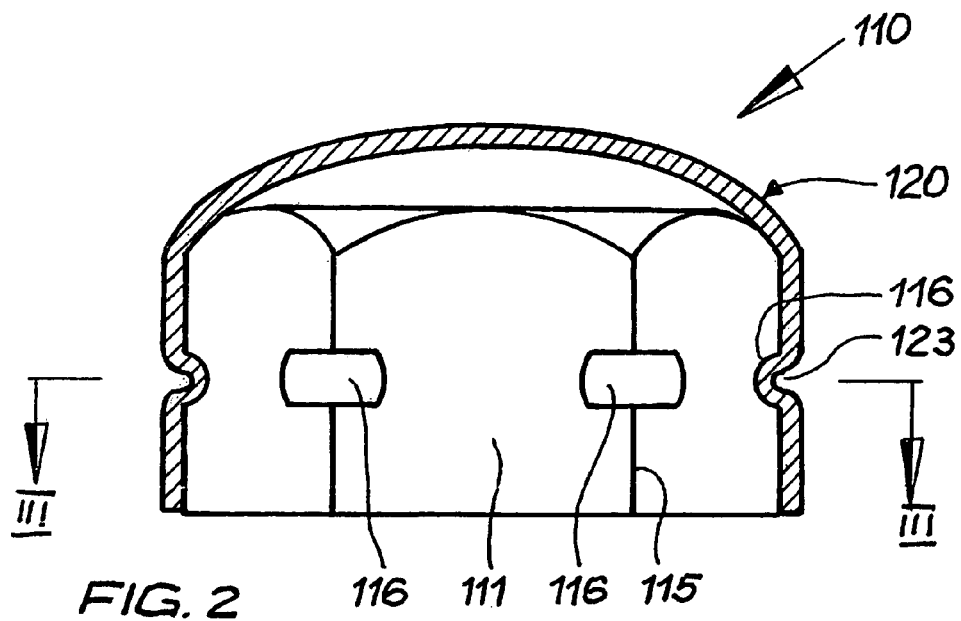
FIG. 2 shows a further exemplary embodiment of a nut according to the invention, the cap being shown in section.
Figure 3:
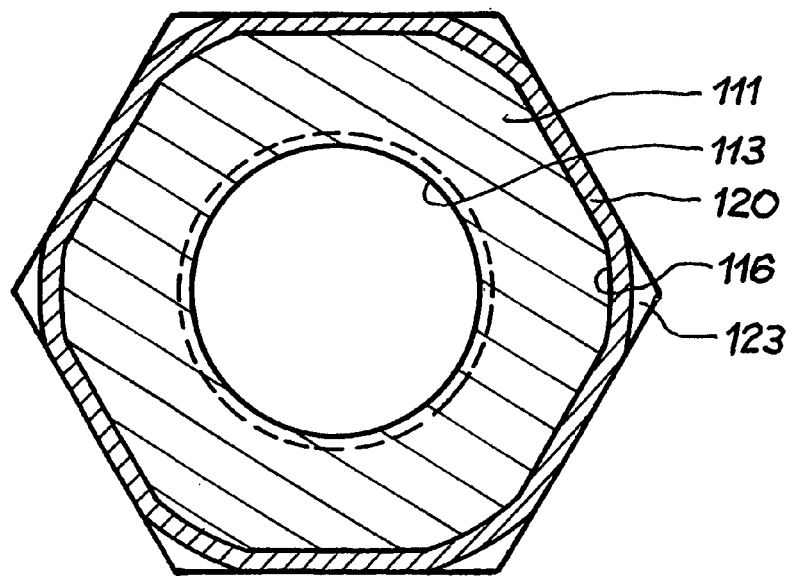
FIG. 3 shows the nut according to FIG. 2 in a sectional plan view.

FIGS. 2 and 3 show a further exemplary embodiment of a simple nut 110. The nut 110 has a nut body 111 having an axial tapped hole 113 for accommodating a stud bolt (not shown). In the exemplary embodiment, the nut body 111 is completely encased by a decorative cap 120, which is made, for example, of polished, stainless steel. The cap 120 sits on the nut body 111 by means of a light interference fit.

In the exemplary embodiment, the nut body 111 is provided with a hexagon 115 for the application of a fitting tool. In the region of the hexagon 115, the nut body 111 has a plurality of encircling recesses 116, which in the exemplary embodiment are each arranged in the edge regions of the hexagon 115. Corresponding to the recesses 116, the cap 120 has the same number of prominences in the form of encircling constrictions 123, each constriction 123 engaging in a corresponding recess 116 of the nut body 111.

Both the nut body 111 and the cap 120 can each be produced in one operation by forming processes known to the person skilled in the art, for example the nut body 111 by cold or hot pressing and the cap 120 by deep drawing. Two fitting methods are suitable for fitting the cap 120 on the nut body 111.

The first variant consists in the cap 120 already being provided with the constrictions 123 during the production process. The cap 120 is then simply clipped onto the nut body 111, for example like a pushbutton. The second variant provides for the cap 120 to be produced without constrictions, that is to say with a hexagonal lateral surface in the exemplary embodiment. The cap 120 is then put onto the nut body 111, and the constrictions 123 are subsequently molded into the cap 120 by means of a suitable tool, so that the constrictions 123 engage in the recess 116 of the nut body 111.

Figure 4:
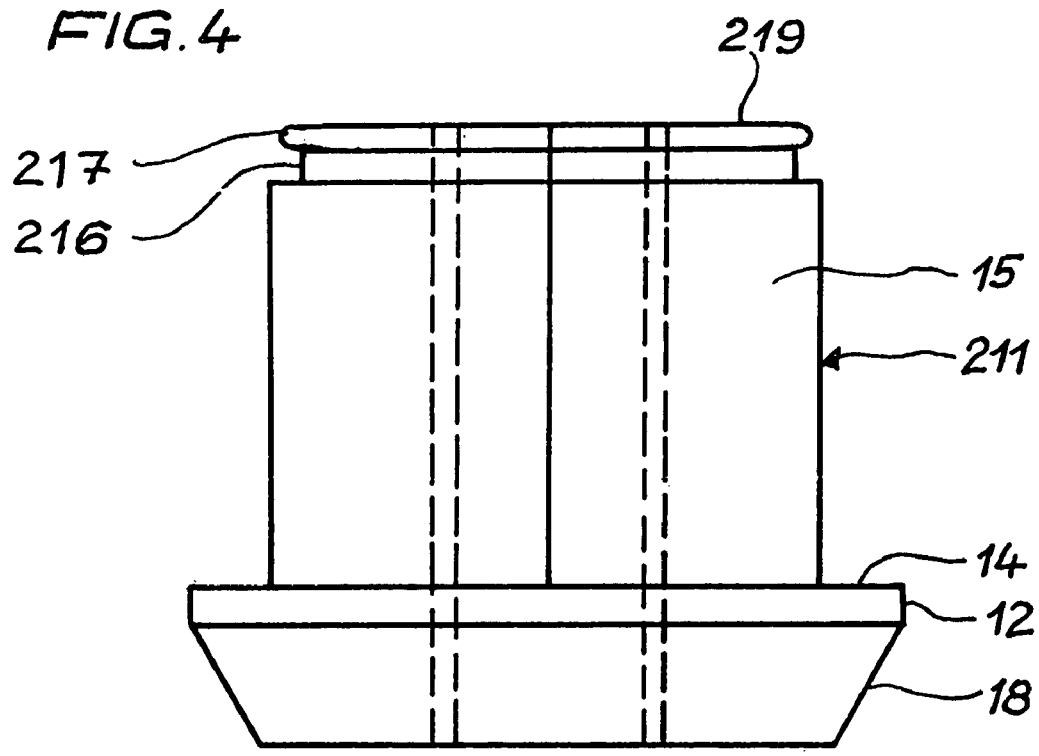
FIG. 4 shows a further exemplary embodiment of a nut body for a nut according to the invention, in a side view.
Figure 5:
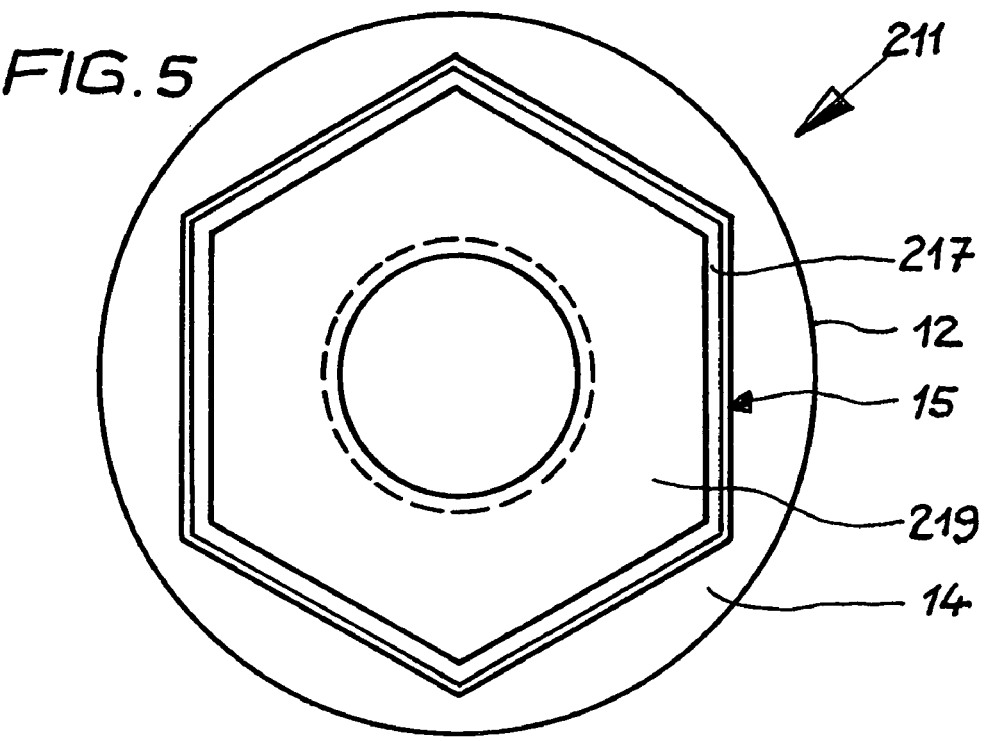
FIG. 5 shows the nut body according to FIG. 4 in a plan view.

FIGS. 4 and 5 show a further exemplary embodiment of a nut body 211 for a nut 210 according to the invention. Above the radially widened collar 12 and the encircling shoulder 14, the nut body 211, in the exemplary embodiment, is also provided with a hexagon 15 for the application of a fitting tool. Above the hexagon 15, the nut body 211 has an encircling recess 216, which is likewise designed in the shape of a hexagon, that is to say in the same shape as the hexagon 15, but with a smaller width across the flats.

An encircling bead 217 adjoins the recess 216. The bead 217, and also, for example, the bead 17 according to FIG. 1, can be formed by the nut body 11, 211 being produced by a forming process, the recess 16, 216 being designed in the form of an extension formed in one piece on the hexagon 15, 215. The end face 219 is then upset, so that the bead 17, 217 is formed.

Figure 6:
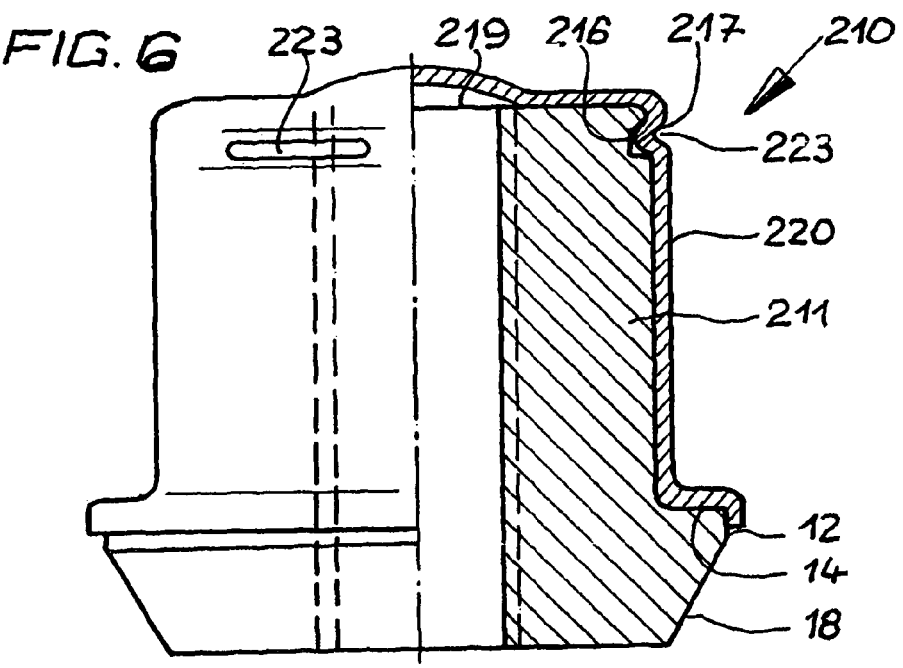
FIG. 6 shows a nut according to the invention having a nut body according to FIGS. 4 and 5, in a partly sectioned illustration.

FIG. 6 shows a nut 210 according to the invention having the nut body 211 shown in FIGS. 4 and 5 and a cap 220. The cap 220 is the same as the cap 20 for the nut 10 according to FIG. 1. To fit the cap 220 on the nut body 211, the constrictions 223 are molded into the cap 220 by means of a tool after the cap 220 has been put on. The constrictions 223 then engage in the recess 216, as has been correspondingly described for the nut 10 according to FIG. 1.

Figure 7:
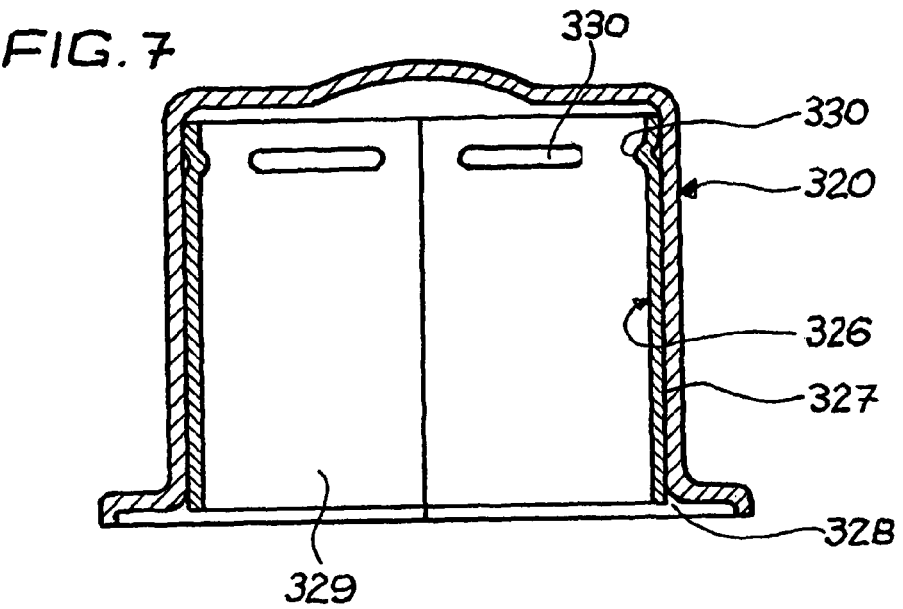
FIG. 7 shows a further exemplary embodiment of a cap for a nut according to the invention, the cap being provided with a sleeve.

FIG. 7 shows a further exemplary embodiment of a cap 320 for a nut according to the invention. The nut body shown here corresponds to the nut bodies 11, 111, 211 already described. After it has been fitted onto the nut body, the cap 320 also has a smooth outer surface, that is to say there are no visible constrictions which correspond to the constrictions 23, 123, 223. Instead, the cap 320 is provided with a sleeve 326. The sleeve 326 may be made of the same material as the cap 320 or of any other desired metallic material or if need be of a suitable plastic. The sleeve 326 bears against the inner surface 327 of the cap 320 and can be held in the cap 320, for example, by clamping, adhesive bonding, brazing, welding or the like. In a suitable configuration of cap 320 and sleeve 326, an annular encircling seam 328 forms at the open end of the cap 320 and sleeve 326, and this seam 328 can be filled, for example, with an adhesive, a brazing filler metal or a welding material.

The inner side 329 of the sleeve 320 is provided with prominences 330, which, when the cap 320 is put onto the nut body 11, 111, 211, engage in the encircling recess 16, 216 (cf.

FIG. 1) or in the recesses 116 encircling in sections (cf. FIG. 2). When the cap 320 is put on, the prominences 330 snap into the recess 16, 216 or the recesses 116 on account of the elasticity of the material.

The present invention can of course also be realized with a screw instead of a nut.

The invention claimed is:

1. A nut having a nut body and a cap held on the nut body, wherein there is provided on the outer surface of the nut body an encircling recess, which an encircling constriction provided in the cap engages, and wherein the nut body is provided with a hexagon for the application of a fitting tool and that the encircling recess is designed in the shape of a hexagon, but with a smaller width across the flats of the hexagon.

2. The nut as claimed in claim 1, wherein the recess is provided in the region of an application surface provided on the outer surface of the nut body for a tool.

3. The nut as claimed in claim 1, wherein the recess is provided above an application surface provided on the outer surface of the nut body for a tool.

4. The nut as claimed in claim 3, wherein the recess is defined by an overhanging bead formed in the region of an end face of the nut body.

5. The nut as claimed in claim 1, characterized in that a sleeve is provided which bears against the inner surface of the cap and on which the encircling restriction is formed, which engages in the encircling recess.

6. The nut as claimed in claim 5, wherein the sleeve is held in the cap by clamping, adhesive bonding, brazing, welding or the like.

7. The nut as claimed in claim 1, wherein the nut body has a widened radial collar which is at least partly enclosed by the cap.

8. The nut as claimed in claim 1, characterized in that the nut has a conical bearing surface below the cap.

9. The nut as claimed in claim 8, wherein the cap has a free encircling edge, which is at a distance from the conical bearing surface.

10. The nut as claimed in claim 1, wherein the cap bears against the nut body in a manner free of play.

* * * * *